W. FORD.
WIND-MILL.
No. 175,960. Patented April 11, 1876.
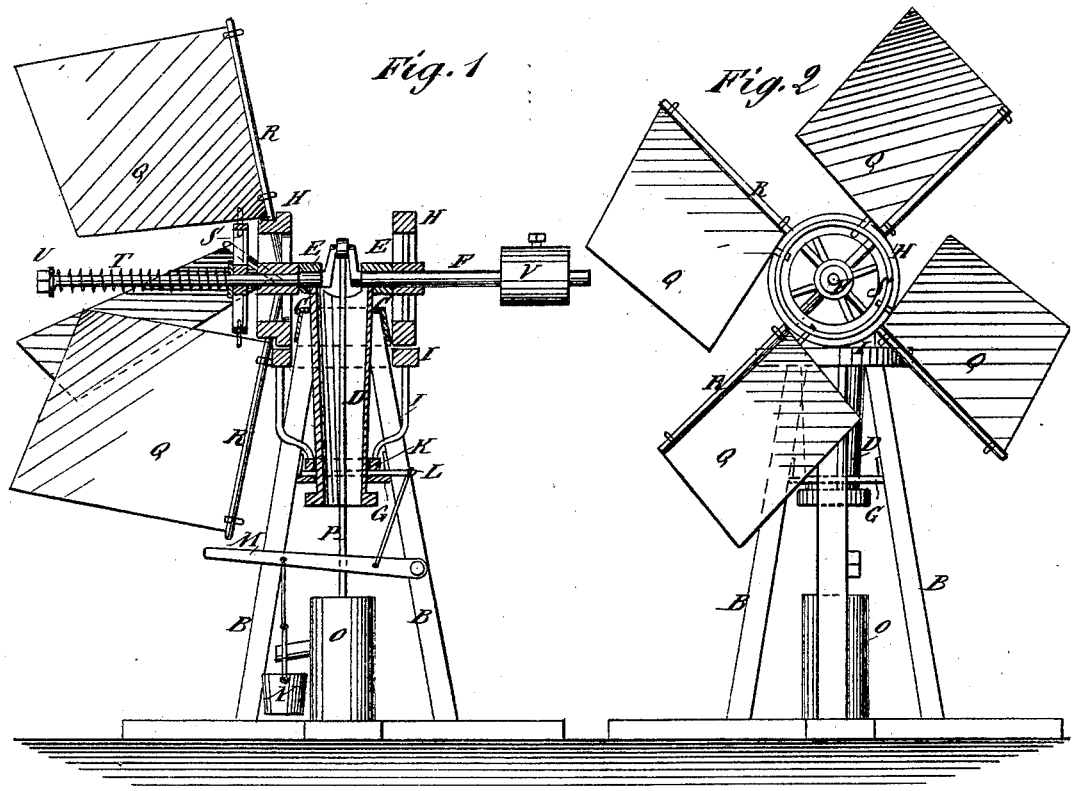
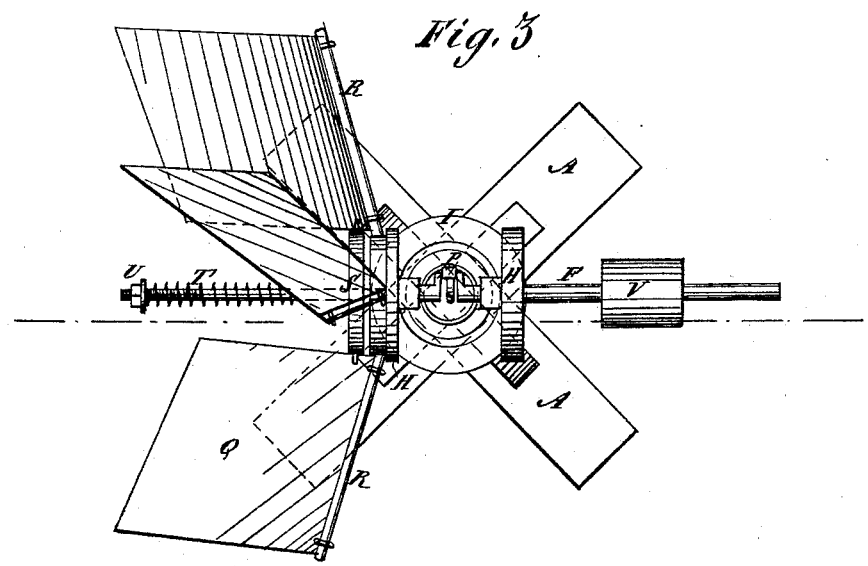
WITNESSES:
C. Neveux
John Goethals
INVENTOR:
Wm Ford
BY Munn
ATTORNEYS.

UNITED STATES PATENT OFFICE.

WILLIAM FORD, OF GREAT BEND, KANSAS.

IMPROVEMENT IN WINDMILLS.

Specification forming part of Letters Patent No. 175,960, dated April 11, 1876; application filed March 13, 1876.

*To all whom it may concern:*

Be it known that I, WILLIAM FORD, of Great Bend, in the county of Barton and State of Kansas, have invented a new and Improved Windmill, of which the following is a specification:

My invention consists of a novel contrivance of the wind-wheel, whereby the fans are self-adjusting to the wind, and the wheel is kept to the wind without a tail-vane. It also consists of a contrivance of apparatus for automatically regulating the speed of the wheel; and it also consists of certain features of the construction calculated to simplify and cheapen the mill, as hereinafter described.

Figure 1 is a sectional elevation of my improved mill, taken on the line $x\ x$ of Fig. 3. Fig. 2 is a front elevation, and Fig. 3 is a top view.

Similar letters of reference indicate corresponding parts.

A represents the base or platform of a portable frame for the support of the mill, the same being a couple of sills crossed in the middle suitably for standing over a well. B represents posts rising up from the middle portion of the frame and connecting together at the top by a metal cup, C, through the center of which rises a large hollow shaft, D, which carries the bearings E for the shaft F of the wind-wheel on the top, and extends down through the stationary plate G at the middle portion of the frame, or thereabout, and revolves freely on its axis, to allow the wheel to shift about with the wind. The shaft F carries two balance-wheels, one on each side of the center, to regulate and control the wheel, and for the application of a brake to stop it when required, the brake being a ring, I, under the wheels, supported on rods J, extending up from the ring K, around shaft D, above the stationary plate G, and subject to the action of lever L, which is worked by lever M, on which is a bucket, N, into which water is delivered from the pump O, when the wheel runs and works the pump by the rod P. When this bucket fills and descends by its weight it presses the brake-ring I up against the wheels H, and stops the wind-wheel until the bucket empties, for which it will have a faucet to draw off the water as required.

The fans Q of the wind-wheel are attached at one edge to the arms, so that the pressure of the wind on them tends to turn the arms, and the arms are fixed in wheel H, so that they can turn to present more or less surface to the wind, according to the force of it, and to hold the fans to the wind they are connected a little distance from the arms with the ring S, which slides along the shaft, and is pressed by the coiled spring T against the action of the wind, so that when the wind is light it turns the fans to it sidewise, and when it is strong the wind turns the fans the other way, and presses the spring back. The power of the spring may be varied by shifting the nut U along the shaft. A counterbalance-weight, V, is applied to the shaft opposite to the wheel, to balance it in the bearings.

The fans are constructed to receive the wind from or at the rear side of the frame, so that it is its own regulating-vane, and thus avoids the necessity of a special regulator.

If the wheel is to be used for driving other machinery a vertical shaft will be arranged in the place of the pump-rod, with a gear-wheel on the top, gearing with another on the shaft F, in place of the crank.

Having thus described my invention, I claim as new and desire to secure by Letters Patent—

1. The hollow shaft D, bearings E, shaft F, cap C, and plate G, combined and arranged substantially as specified.

2. The brake-ring I, supports J, ring K, and lever L, combined and arranged with the wheels H and shaft F, substantially as specified.

3. The bucket N and lever M, combined with pump O, lever L, ring K, standard J, and brake-ring I, substantially as specified.

4. The fans Q, arms R, ring S, and spring T, combined and arranged substantially as specified.

WILLIAM FORD.

Witnesses:
   C. P. TOWNSLEY,
   E. M. BURTON.